US011269625B1

(12) United States Patent
Lin et al.

(10) Patent No.: US 11,269,625 B1
(45) Date of Patent: Mar. 8, 2022

(54) METHOD AND SYSTEM TO IDENTIFY AND PRIORITIZE RE-FACTORING TO IMPROVE MICRO-SERVICE IDENTIFICATION

(71) Applicant: International Business Machines Corporation, Armonk, NY (US)

(72) Inventors: Chen Lin, Elmsford, NY (US); Jinho Hwang, Ossining, NY (US); Muhammed Fatih Bulut, West Greenwich, RI (US); Ali Kanso, Stamford, CT (US); Shripad Nadgowda, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/075,432

(22) Filed: Oct. 20, 2020

(51) Int. Cl.
| | |
|---|---|
| *G06F 9/44* | (2018.01) |
| *G06F 8/72* | (2018.01) |
| *G06F 11/36* | (2006.01) |
| *G06K 9/62* | (2022.01) |
| *G06N 3/12* | (2006.01) |

(52) U.S. Cl.
CPC ............ *G06F 8/72* (2013.01); *G06F 11/3636* (2013.01); *G06K 9/623* (2013.01); *G06K 9/6215* (2013.01); *G06K 9/6218* (2013.01); *G06N 3/126* (2013.01)

(58) Field of Classification Search
None
See application file for complete search history.

(56) References Cited

U.S. PATENT DOCUMENTS

| | | | |
|---|---|---|---|
| 7,451,439 B2 | 11/2008 | Nickell et al. | |
| 8,181,153 B2 | 5/2012 | Grechanik | |
| 8,856,738 B2 | 10/2014 | Frenkiel et al. | |
| 9,195,810 B2 | 11/2015 | Kirovski et al. | |
| 9,658,907 B2 | 5/2017 | Rodmell | |
| 9,740,480 B1 | 8/2017 | Ghouti et al. | |
| 11,042,369 B1* | 6/2021 | Kimball | G06F 8/34 |
| 2013/0104104 A1 | 4/2013 | Murthy et al. | |
| 2014/0304677 A1* | 10/2014 | Allam | G06F 9/44 |
| | | | 717/102 |
| 2015/0370690 A1* | 12/2015 | Rodmell | G06F 11/008 |
| | | | 717/124 |
| 2017/0315803 A1 | 11/2017 | Ghouti et al. | |
| 2019/0317760 A1* | 10/2019 | Kessentini | G06F 8/72 |
| 2020/0249941 A1* | 8/2020 | Tornhill | G06F 8/77 |
| 2020/0293313 A1* | 9/2020 | Kadam | G06F 8/443 |
| 2021/0263735 A1* | 8/2021 | Harishankar | G06F 8/36 |

FOREIGN PATENT DOCUMENTS

| | | |
|---|---|---|
| CN | 103559025 | 2/2014 |
| JP | 5212145 | 6/2013 |

* cited by examiner

*Primary Examiner* — Insun Kang
(74) *Attorney, Agent, or Firm* — Lieberman & Brandsdorfer, LLC

(57) ABSTRACT

A computer system, computer program product, and computer-implemented method to identify one or more re-factoring operations directed at micro-service identification for source code. A genetic algorithm is leveraged to produce an offspring population of re-factoring operations from a parent set. The offspring population is subject to an assessment utilizing one or more objective measures. Responsive to the assessment, one or more identified re-factoring operations are selectively applied to the source code to produce one or more corresponding micro-service candidates.

18 Claims, 6 Drawing Sheets

METHOD AND SYSTEM TO IDENTIFY AND PRIORITIZE RE-FACTORING TO IMPROVE MICRO-SERVICE IDENTIFICATION

BACKGROUND

The present embodiments relate to application modernization, such as breaking down a monolithic application into micro-services and migrating to a cloud environment. More specifically, the embodiments are directed to identifying and prioritizing a sequence of re-factoring operations directed at micro-service identification.

Application modernization is a process of re-factoring a monolithic application into standalone micro-services. Much of the discussion around application modernization focuses on monolithic, on-premises applications. One aspect of modernization involves moving a monolithic application from on-premises infrastructure to remote shared infrastructure, also referred to as the "cloud." Another aspect involves modernizing the monolithic applications to a micro-services architecture. Generally, micro-services are an architectural approach, often cloud native, in which a single application is composed of multiple loosely coupled and independently deployable smaller components or services, referred to as micro-services. The micro-services typically (but not necessarily) have their own stack, inclusive of a database and data model, communicate with one another over a combination of representational state transfer (REST) application programming interfaces (APIs), and are organized by business capability.

Re-factoring is defined as a process of changing software such that the changes do not alter the external behavior of the code, yet improve internal code structure. More specifically, re-factoring is directed at improving code design after the code has been written. Some of these aspects of improving code design include removing duplication, improving communication, simplifying structure, and adding flexibility. There are challenges associated with re-factoring, and specifically micro-service identification. The quality of the identified micro-service candidates largely depends on the design of the existing code, e.g. the monolithic application. Accordingly, there is a need for a qualitative improvement of re-factoring and identification of re-factoring operations.

SUMMARY

The embodiments include a computer system, a computer program product, and a computer-implemented method for training a machine learning (ML) model and leveraging the ML model to identify compliance requirements corresponding to one or more micro-services.

In one aspect, a computer system is provided with a processor operatively coupled to memory, with tools operatively coupled to the processor, including a genetic manager, a score manager, and a classifier. The genetic manager is configured to apply a genetic algorithm to one or more parent re-factoring operations selected from an initial identified set of re-factoring operations for the source code. The applied genetic algorithm produces an offspring population of the re-factoring operations as a sub-set of the parent re-factoring operations. The score manager, which is operatively coupled to the genetic manager, is configured to measure a fitness score of each re-factoring operation in the sub-set. The fitness score measurement includes collecting runtime traces of the source code and applying the collected runtime traces to the sub-set. The classifier is configured to prioritize re-factoring operations within the sub-set based on a corresponding measured fitness score. Responsive to the prioritization, the processor selectively applies one or more of the re-factoring operations from the sub-set to the source code to produce one or more micro-service candidates.

In another aspect, a computer program product is provided with a computer readable storage medium having program code embodied therewith. Program code, which is executable by a processor, is provided to apply a genetic algorithm to one or more parent re-factoring operations selected from an initial identified set of re-factoring operations for the source code. The applied genetic algorithm produces an offspring population of the re-factoring operations as a sub-set of the parent re-factoring operations. The program code measures a fitness score of each re-factoring operation in the sub-set. The fitness score measurement includes collecting runtime traces of the source code and applying the collected runtime traces to the sub-set. The program code prioritizes re-factoring operations within the sub-set based on a corresponding measured fitness score. Responsive to the prioritization, the program code selectively applies one or more of the re-factoring operations from the sub-set to the source code to produce one or more micro-service candidates.

In yet another aspect, a genetic algorithm is applied to one or more parent re-factoring operations selected from an initial identified set of re-factoring operations for the source code. The applied genetic algorithm produces an offspring population of the re-factoring operations as a sub-set of the parent re-factoring operations. A fitness score of each re-factoring operation in the sub-set is measured. The fitness score measurement includes collecting runtime traces of the source code and applying the collected runtime traces to the sub-set. The re-factoring operations within the sub-set are prioritized based on a corresponding measured fitness score. Responsive to the prioritization, one or more of the re-factoring operations from the sub-set are selectively applied to the source code to produce one or more micro-service candidates.

These and other aspects, features and advantages will become apparent from the following detailed description of the exemplary embodiments, taken in conjunction with the accompanying drawings.

BRIEF DESCRIPTION OF THE SEVERAL VIEWS OF THE DRAWINGS

The drawings referenced herein form a part of the specification and are incorporated herein. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the computer system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. The various embodiments may be combined with one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Embodiments described herein involve identification and prioritization of re-factoring operations, and in an exemplary embodiment prioritization of a sequence of re-factoring operations. The prioritization is directed at providing high-quality micro-services with low operation cost and high functional cohesion, particularly in connection with a modernization process such as conversion of an on-premises (or off-premises) monolithic application to a cloud environment. It is understood in the art that a monolithic application is a self-contained application independent from other applications. Micro-services or a micro-service architecture typically refer to a computer environment in which an application is built as a suite of modular components or services based on function definitions, each corresponding to one function definition, and each running in its own process and communicating by a way of lightweight mechanisms. In certain micro-service architecture, data is stored outside of the service, and as such the service is stateless. The services or components are commonly referred to as "atomic services." Each atomic service is a lightweight component for independently performing a modular service. For example, an atomic service might receive and combine keywords, process an algorithm, or make a decision based on the result of algorithm processing. Each module supports a specific task and uses a defined interface, such as an application programming interface (API) to communicate with other services. The micro-service architecture supports and enables scalability in a hybrid network.

Figure 1:
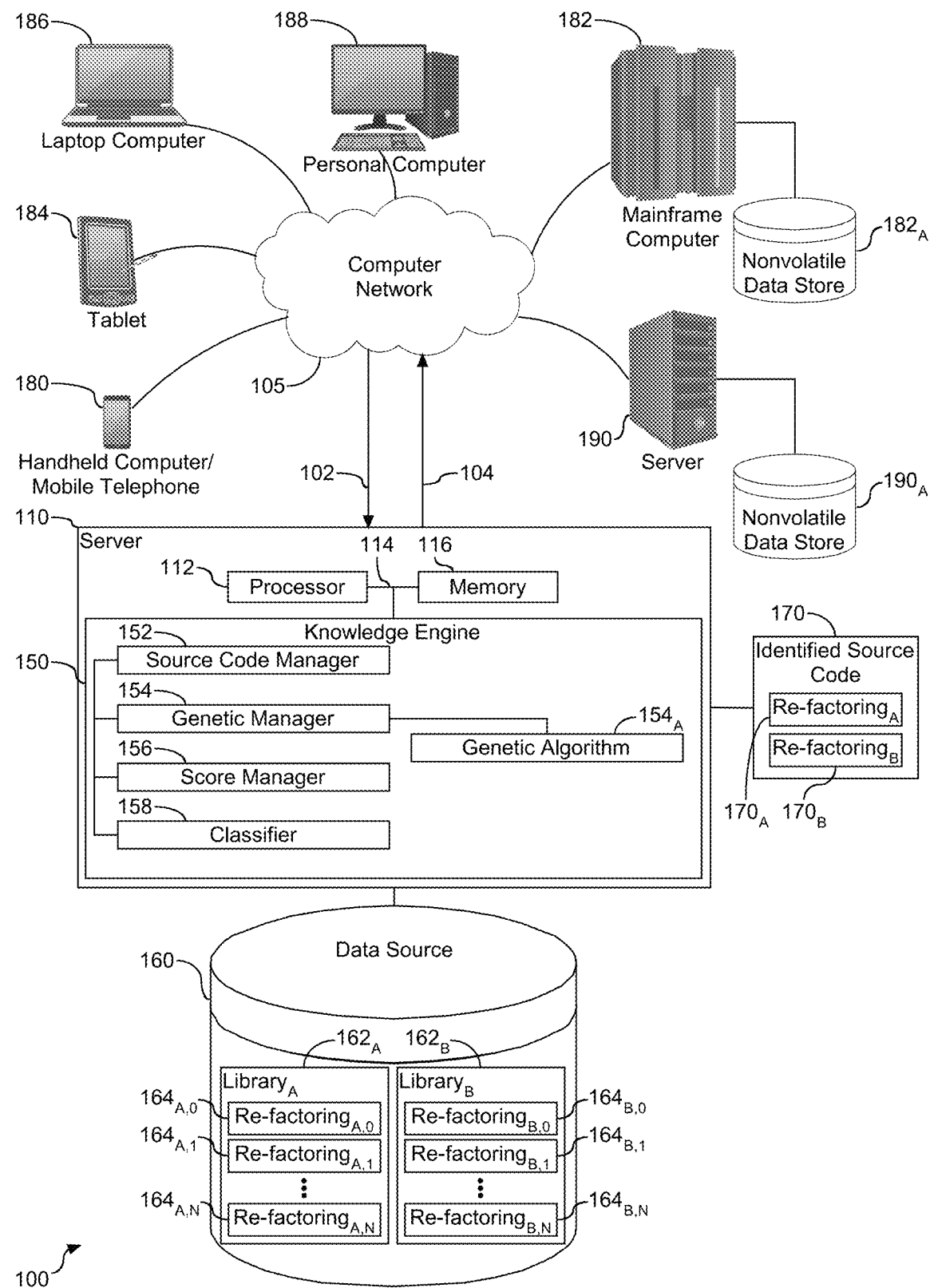
FIG. 1 depicts a system diagram illustrating a computer system to produce one or more corresponding micro-service candidates for source code.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit, e.g., processor, (112) in communication with memory (116) across a bus (114). The server (110) is shown with a knowledge engine (150) configured with one or more tools to identify source code re-factoring operations and to produce one or more corresponding micro-service candidates. As shown, the server (110) may apply the one or more produced micro-service candidates to one or more of the computing devices (180), (182), (184), (186), (188), and (190) over the network (105). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable source code communication, re-factoring operation prioritization, and micro-service production. Other embodiments of the server (110) may be used with components, systems, sub-systems, and/or devices other than those that are depicted herein.

The knowledge engine (150) is shown herein configured with tools to identify re-factoring operations for source code. The tools include, but are not limited to, a source code manager (152), genetic manager (154), a score manager (156), and a classifier (158). Although the source code manager (152), the genetic manager (154), the score manager (156), and the classifier (158) are illustrated in FIG. 1 as embedded in the knowledge engine (150), in other embodiments the tools (152), (154), (156), and (158) may be apart or external from the knowledge engine (150).

The knowledge engine (150) may receive input from the network (105) and/or leverage a data source (160), also referred to herein as a corpus or knowledge base, to identify potential re-factoring operations. Re-factoring is a process of changing a software system in a manner that does not alter external code behavior, but improves its internal structure. In an exemplary embodiment, re-factoring is directed at revising source code or improving source code structure to make it more efficient, scalable, maintainable, or re-useable, without changing any functions of the program. Re-factoring as shown and described herein, is directed at application modernization and moving a legacy application from a monolithic structure to micro-services. As shown, the data source (160) is configured with one or more libraries, shown herein by way of example as library$_A$ (162$_A$) and library$_B$ (162$_B$). The quantity of libraries shown herein is for exemplary purposes and should not be considered limiting. Each library is shown with a plurality of re-factoring operations. As shown, library$_A$ (162$_A$) is shown with re-factoring operations (164$_{A,0}$), (164$_{A,1}$), . . . , (164$_{A,N}$), and library$_B$ (162$_B$) is shown with re-factoring operations (164$_{B,0}$), (164$_{B,1}$), . . . , (164$_{B,N}$). The quantity of re-factoring operations in each library is for exemplary purposes and should not be considered limiting. Re-factoring operations may be logically grouped into libraries for use as part of the corpus (160) of data with the knowledge engine (150). Accordingly, the data source (160) functions as a resource of libraries and corresponding re-factoring operations available to the knowledge engine (150) and corresponding tools.

Re-factoring operations are utilized to produce one or more corresponding micro-services or micro-service candidates for the source code. The various computing devices (180), (182), (184), (186), (188), and (190) in communication with the server (110) across the network (105) may include access points to the knowledge engine (150). Some of the computing devices may include devices for storing the identified re-factoring operation(s) produced by support of the knowledge engine (150) to generate response output (104), and to communicate the response output (104) to a corresponding network device architecture operatively coupled to the server (110) or one or more of the computing devices (180), (182), (184), (186), (188), and (190) across the computer network (105).

The network (105) may include local network connections and remote connections in various embodiments, such that the knowledge engine (150) may operate in environments of any size, including local and global, e.g., the Internet. Additionally, the knowledge engine (150) serves as a front-end system that can make available a variety of knowledge extracted from one or more data sources represented in network accessible sources and/or structured data sources. In this manner, some processes populate the knowledge engine (150), with the knowledge engine (150) also including input interfaces to receive requests and respond accordingly.

Source code (170) is either selected or identified for modernization. In an exemplary embodiment, the identified source code (170) is communicated to the server (110) across the network (105) from one of the computing devices (180), (182), (184), (186), (188), and (190). A source code manager (152) conducts an initial processing of the source code (170) to identify an initial set of re-factoring operations ($170_A$), also referred to herein as parent re-factoring operations. In an embodiment, the initial set ($170_A$) is a randomly selected sub-set from a pool of re-factoring operation. The genetic manager (154) interfaces with the source code manager (152) and applies a genetic algorithm ($154_A$) to one or more parent re-factoring operations selected from the initial set of re-factoring operations ($170_A$) for the source code (170). The genetic algorithm ($154_A$) produces an offspring population of re-factoring operations ($170_B$) as a sub-set of the parent re-factoring operations ($170_A$). In an exemplary embodiment, the genetic algorithm ($154_A$) reflects the process of natural selection to produce offspring which inherit at least one or more characteristics of the parents to be added to the next generation. The genetic manager (154) applies a crossover operation to generate a combination of offspring re-factoring operations, and in addition applies a mutation operator to introduce variability to the generated combination. The crossover operation is applied to each pair of parent re-factoring operations. Offspring re-factoring operations are created by exchange until a crossover point is reached, at which time new offspring re-factoring operations are added to the population of re-factoring operations. In a select set of new offspring re-factoring operations, some of their components can be subject to a mutation. The mutation occurs to maintain diversity and introduce variability within the population and to prevent premature convergence. Accordingly, the genetic manager (154) functions to interface with a set of re-factoring operations to identify and produce an offspring population of re-factoring operations.

The score manager (156), which is shown herein operatively coupled to the genetic manager (154), functions to measure a fitness score of each of the re-factoring operations in the sub-set, e.g. ($170_B$). The fitness score is an objective measurement of the corresponding micro-service candidates. Details of the fitness score are shown and described in FIG. 3. With respect to the natural selection process, the fitness score measurement is assigned to each of the re-factoring operations in the sub-set. The probability that a re-factoring operation will be selected is based on the corresponding fitness score. As shown and described in FIG. 3, in parallel to the initial identification of re-factoring operations the source code manager (152) collects runtime traces of the source code (170). In an exemplary embodiment, the runtime traces identify dependency information associated with source code execution. The score manager (156) collects and applies the runtime traces to the identified sub-set, e.g. ($170_B$). Accordingly, the fitness score measurement incorporates functionality of the source code manager (152) with respect to runtime traces and functionality of the score manager (156) with respect to fitness score assessment.

The re-factoring operations are correlated with corresponding micro-service candidates. The score manager (156) modifies the collected runtime traces according to the re-factoring operations in the sub-set, e.g. ($170_B$), and then applies a clustering algorithm to the modified runtime traces to identify micro-service candidates. As such, the fitness score assessment functions as a measurement of the corresponding micro-service candidates. In an embodiment, the micro-service candidate measurement corresponds to quality, which may be a combination of objective measurements. The score manager (156) selects one or more re-factoring operations in the sub-set, e.g. ($170_B$). In an exemplary embodiment, the selection includes operations in the sub-set having a smallest Euclidean distance to a maximum combination of the objective measurements. The application of the genetic algorithm ($154_A$) and the fitness score measurement is an iterative process, as shown and described in FIG. 3, with the selection of one or more re-factoring operations by the score manager (156) being a next parent or set of parent re-factoring operations and is subject to a genetic operation and offspring population.

The iterative process of prioritization of re-factoring operations has a stopping point. For example, the stopping point may correspond to a quantity of iterations, or in an embodiment a quality measurement corresponding to the fitness score measurement. At such time as the stopping point or criteria have been attained, the identified re-factoring operations in the sub-set, e.g. ($170_B$) are subject to a prioritization protocol by the classifier (158) with the prioritization based on the corresponding fitness score measurement associated with each individual re-factoring operation in the sub-set. In an exemplary embodiment, the prioritization of re-factoring operations enables developers to focus on the most important re-factoring operations given constraints of time and resources. In an embodiment, the prioritization conducted by the classifier (158) is a multi-objective optimization problem using a non-dominated sorting genetic algorithm (NSGA-II). Output from the classifier (158) is a set of prioritized re-factoring operations. Re-factoring opportunities are recommended before identifying micro-services to improve source code quality. The processor (112) selectively applies the identified and prioritized re-factoring operations to the source code, which yields as output corresponding to micro-service candidates ($170_C$). Accordingly, the tools and their corresponding functionality as described herein prioritizes re-factoring operations to yield functionally effective and enhanced micro-service decomposition, with the corresponding micro-services having low operation costs and high functional cohesion.

Source code modernization requests received across the network (105) may be processed by a server (110), for example IBM Watson® server, and the corresponding knowledge engine (150). As shown herein, the knowledge engine (150) together with the embedded tools (152), (154), (156), and (158) generates a set of prioritized re-factoring operations, and applies the generated set to the source code to produce micro-service candidates for a micro-service based architecture.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive or detect a source code modernization request as input content (102), which the Watson® system then analyzes to identify the set of prioritized re-factoring operations before identifying micro-services.

The managers (152), (154), (156), and (158), hereinafter referred to collectively as knowledge engine tools, are shown embodied in or integrated within the knowledge engine (150) of the server (110). The tools may be implemented in a separate computing system (e.g., 190), or in an embodiment a system or systems, can they be implemented in two or more connected across network (105) to the server (110). Wherever embodied, the tools (152), (154), (156), and (158) function to leverage the runtime traces and a genetic algorithm to prioritize re-factoring operations to be applied to the corresponding source code to produce micro-service candidates and effectively and efficiently modernize the source code.

Types of devices and corresponding systems that can utilize the knowledge engine (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store (190a), and mainframe computer (182) utilizes nonvolatile data store (182a)). The nonvolatile data store (182a) can be a component that is external to the various devices and systems or can be internal to one of the devices and systems.

The device(s) and system(s) employed to support the knowledge engine (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device, or other devices that include a processor and memory.

Figure 2:
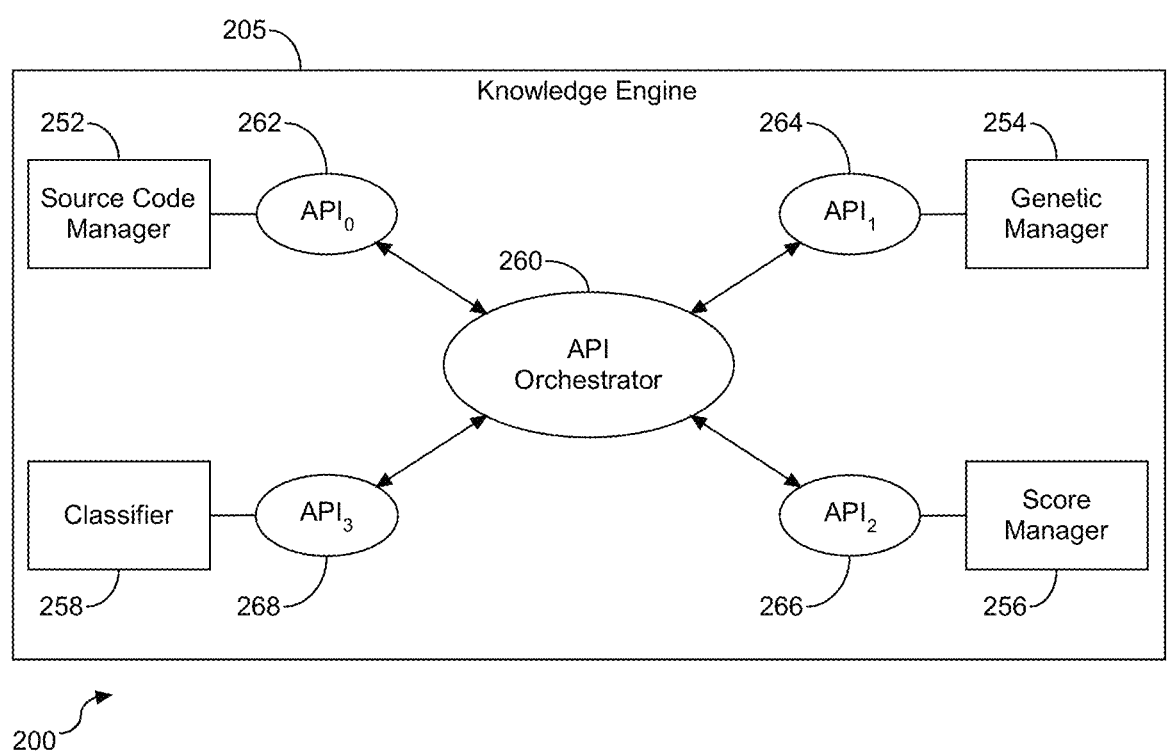
FIG. 2 depicts a block diagram illustrating the tools, as shown and described in FIG. 1, and their associated application program interfaces.

An Application Program Interface (API) is understood in the art as a software intermediary between two or more applications. With respect to the knowledge engine (150) shown and described in FIG. 1, one or more APIs may be utilized to support one or more of the tools (152), (154), (156) and (158) and their associated functionality. Referring to FIG. 2, a block diagram (200) is provided illustrating the tools (152), (154), (156), and (158) and their associated APIs. As shown, a plurality of tools is embedded within the knowledge engine (205), with the tools including the source code manager (152) shown in FIG. 2 as (252) associated with $API_0$ (262), the genetic manager (154) shown in FIG. 2 as (254) associated with $API_1$ (264), the score manager (156) shown in FIG. 2 as (256) associated with $API_2$ (266), and the classifier (158) shown in FIG. 2 as (258) associated with $API_3$ (268). Each of the APIs may be implemented in one or more languages and interface specifications. $API_0$ (252) provides functional support to conduct an initial processing of the source code to identify an initial set of re-factoring operations, also referred to herein as parent re-factoring operations, and provide runtime traces of the source code; $API_1$ (254) provides functional support to application of a genetic algorithm to the parent re-factoring operation(s), with the genetic algorithm producing an offspring population of re-factoring operations; $API_2$ (256) provides functional support to assess a fitness score of each re-factoring operation in the offspring population; and $API_3$ (258) provides functional support to prioritize re-factoring operations within the offspring population, with the prioritization corresponding or related to the fitness score assessment. As shown, each of the APIs (252), (254), (256), and (258) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
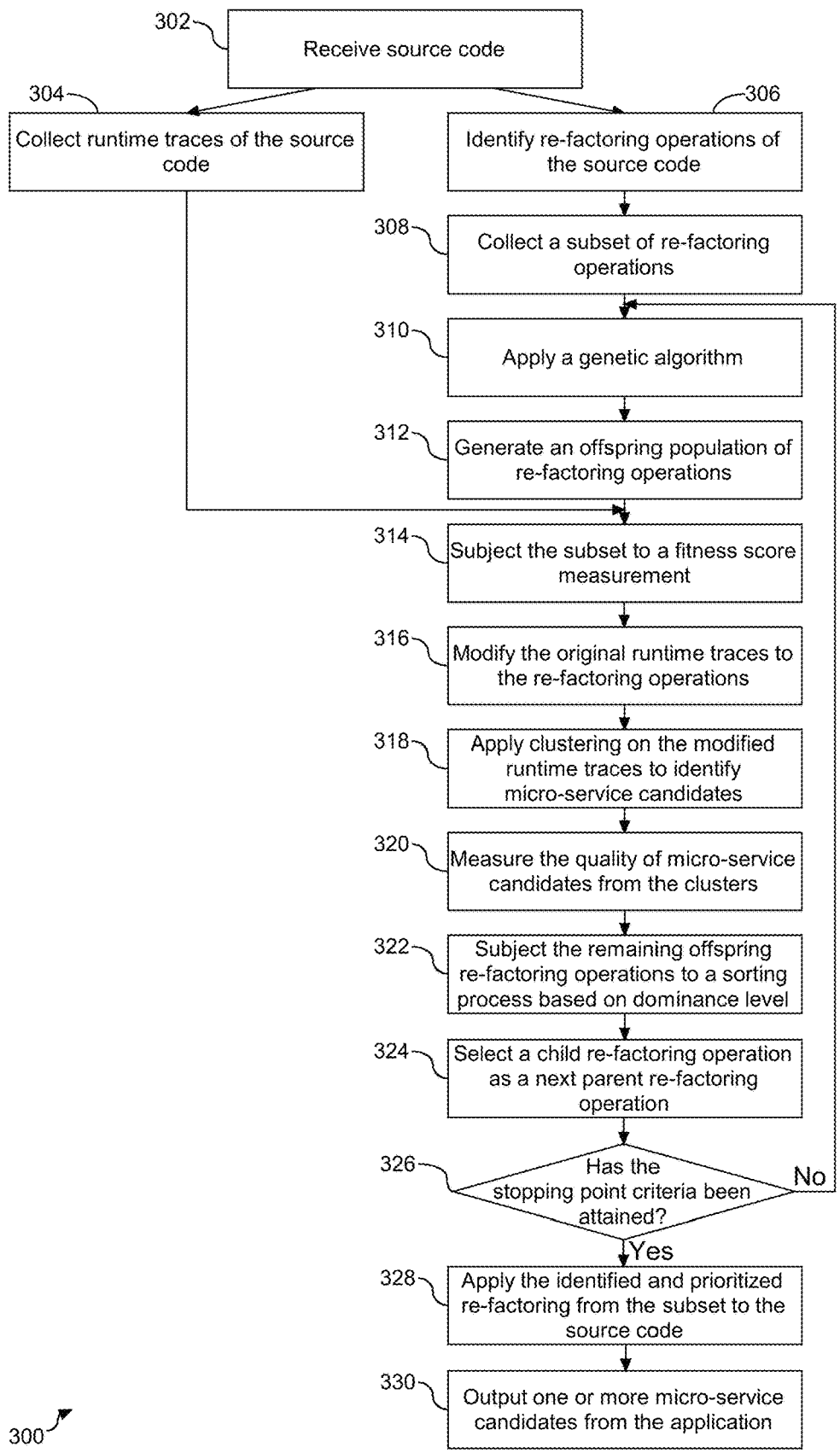
FIG. 3 depicts a flowchart illustrating a process for source code modernization, including analyzing source code to identify a set of prioritized re-factoring operations before identifying micro-services.

Referring to FIG. 3, a flowchart (300) is provided illustrating a process for source code modernization, including analyzing source code to identify a set of prioritized re-factoring operations before identifying micro-services. As shown, source code is received or otherwise identified (302). Thereafter, two aspects of the received or identified source code are conducted in parallel, including application of a genetic algorithm and collection of runtime traces. Runtime traces of the source code are collected to identify dependency information associated with source code execution (304). For example, in an embodiment of a class based object-oriented programming language, the collection of runtime traces employs a call invocation during runtime execution to collect which classes from source code execution calls another class, where a class is used to define objects and methods. Based on this embodiment, the identification at step (304) identifies dependency information of classes and their corresponding objects and methods. In parallel to the collection at step (304), static dependency of source code is identified starting with identification of re-factoring operations for the source code (306). In an embodiment, the identification at step (306) utilizes code smells detection rules. Code smells are known in the art as violations of coding design principles. A smell does not necessarily cause a fault, but may lead to other negative consequences impacting the source code. From the identification at step (306), a sub-set of re-factoring operations are randomly selected from a pool of re-factoring operations (308). More specifically, given a set of identified operations $O=\{o_1, o_2, \ldots, o_n\}$ a sub-set of operations for K iterations is randomly selected to produce an initial population of size K. A genetic algorithm is then applied to one or more parent re-factoring operations selected from the initial set of re-factoring operations for the source code to produce an offspring population of re-factoring operations (310).

The aspect of applying a genetic algorithm at step (310) on the parent population includes application of crossover and mutation to create a different combination of re-factoring operations. In an exemplary embodiment, the genetic algorithm reflects the process of natural selection to produce offspring which inherit one or more characteristics of the parents to be added to the next generation. Re-factoring operations are shown herein as method-level and class-level, with method level techniques directed at making code changes at a method level. A method is a collection of statements that are grouped together to perform an operation. Examples of method level techniques include, but are not limited to, extract a method, move method call inline, or turn a long method into a class. In an embodiment, there may be additional or alternative method level techniques, and as such these examples should not be considered limiting. The re-factoring techniques in this group, i.e. method level techniques, re-organize the methods among the classes, such as moving a method from one class to another class. Class level techniques are directed at changing the behavior of how classes interact with each other, where a class is a user defined blueprint or prototype from which objects are created. Examples of class level techniques include, but are not limited to, splitting one class into two or more classes, or removing a class. In an embodiment, there may be additional or alternative class level techniques, and as such these examples should not be considered limiting. As shown herein by way of example, parent crossover is employed to generate offspring. A parent of two solutions is randomly selected from the initial population. In an exemplary embodiment, for each parent, the offspring inherits one or more of the re-factoring operations. The following are examples of parent crossover:

Example 1, Parent Crossover

Parent$_1$: move field (class A, class B, field a) and move method (class B, class C, method a) which is interpreted as moving function a from class A to class B and moving method a from class B to class C.

Example 2, Parent Crossover

Parent$_2$: move field (class C, class D, field b) and pull up field (class E, class F, field c)
which is interpreted as moving function b from class C to claim D and if class E is a child from class F, then moving function c from class E to class F.

In addition, child crossover may also be utilized from the offspring generated by the parent. The following are examples of child crossover.

Example 3, Child Crossover

Child$_1$: move field (class A, class B, field a) and pull up field (class E, class F, field c)

Example 4, Child Crossover

Child$_2$: move field (class C, class D, field b) and move method (class B, class C, method a)
With a mutation probability, an offspring, e.g. Child$_1$ or Child$_2$, is randomly selected after crossover to introduce variability of the solutions. After, the offspring random selection, one or more re-factoring operations are randomly chosen to be replaced by another re-factoring operation. The following is an example of mutation:

Child$_1$ before mutation: move field (class A, class B, field a) and pull up field (class E, class F, field c)
Child$_2$ after mutation: inline class (class G, class H) and pull up field (class E, class F, field c)
As shown in this mutation example, a different re-factoring operation "inline class" is introduced.

An offspring population of re-factoring operations is generated by the genetic algorithm, with the offspring population being a sub-set of the parent re-factoring operations (312). As shown, information is extracted from the collected runtime traces to calculate the fitness score measurement, e.g. the number of runtime calls between two classes. The offspring population, e.g. the sub-set, is then subject to a fitness score measurement for each re-factoring operation in the sub-set of re-factoring operations (314). The fitness score measurement is a vector of objective functions, $f_1$-$f_6$, as defined below. Each candidate offspring re-factoring operation provides a list of candidate micro-services. The fitness score is a measure of quality of each of the re-factoring operations in the sub-set. The probability that a re-factoring operation will be selected is based on the corresponding fitness score. The fitness score assessment at step (314) is comprised of several sub-processes, including modifying the original runtime traces according to the re-factoring operations (316) and applying clustering on the modified runtime traces to identify micro-service candidates (318). For example, the clustering is applied based on a similarity measurement which is calculated based on the number of run-time calls between two classes. More specifically, two classes with a high number of run-times calls have a high similarity. The clustering method provides grouping of classes, with each group, e.g. cluster, identifying micro-service candidates. Following step (318), the quality of micro-service candidates from the clusters is measured (320). The quality of the micro-service candidates is subject to measuring based on fitness functions $f_1$-$f_6$, as described below, to assess the quality of the formed clusters. In an exemplary embodiment, the fitness score measurement utilizes a function as a vector of objective functions for micro-service quality. The following are examples of the objective functions, e.g. objective measurements, as an evaluation model for micro-service quality and fitness functions to search for near-optimal solution:

$f_1$: structural intra-connectivity within two clusters, e.g. $C_0$ and $C_1$, where:

$$f_1 = \frac{1}{k}\sum_{i=1}^{k}\frac{u_i}{N_i^2}$$

where k is the number of partitions; $N_i$ is the number of classes for partition i; and $u_i$ is the total number of method calls within partition i.

$f_2$: structural inter-connectivity between two clusters, e.g. $C_0$ and $C_1$, where:

$$f_2 = \frac{1}{k(k-1)}\sum_{i \neq j}^{k}\frac{\sigma_{i,j}}{2*N_i*N_j}$$

wherein k is the number of partitions; $N_i$ is the number of classes for partition i; and $\sigma_i$ is the total number of method calls between partition i and partition j.

$f_3$: data intra-dependency within each cluster, where:

$$f_3 = \frac{1}{k}\sum_{i=1}^{k} \frac{w_i}{N_i^2}$$

where k is the number of partitions; $N_i$ is the number of classes for partition i; and $w_i$ is the number of data dependencies within partition i.

$f_4$: data interconnectivity between different clusters, where:

$$f_4 = \frac{1}{k(k-1)}\sum_{i \neq j}^{k} \frac{n_{i,j}}{2*N_i*N_j}$$

where k is the number of partitions; $N_i$ is the number of classes for partition i; $n_{i,j}$ is the number of data dependencies between partition i and partition j.

$f_5$: intersection of transaction elements, where:

$$f_5 = \frac{1}{k(k-1)}\sum_{i \neq j}^{k} \frac{s_{i,j}}{2*N_i*N_j},$$

wherein $S_{i,j}=|bc_i \cup bc_j|-|bc_i \cap bc_j|$ where k is the number of partitions; $N_i$ is the number of classes for partition i; and $bc_i$ is the set of business use cases for partition i.

$f_6$: percentage of interface per cluster, where interface is a quantity of functions that belongs to another cluster, where:

$$f_6 = \frac{1}{k}\sum_{i=1}^{k} \frac{I_i}{N_i^2}$$

where k is the number of partitions; $N_i$ is the number of classes for partition i; and $I_i$ is the number of interfaces for partition i, where interface is a method that can be called by class belong to other partition.

The measurement of the quality of micro-service candidates from the clusters at step (320) defines the fitness function as a vector, F, of the fitness functions, where F=($f_1$; $f_2$; $f_3$; $f_4$; $f_5$; $f_6$). In an exemplary embodiment, a near-optimal solutions is referred to herein as a knee point, which is further defined as the smallest Euclidean distance to a combination of the objective measurements to an ideal fitness score, and wherein the ideal fitness score, $F_{ideal}$, is defined as follows:

$F_{ideal}=(\max(f_1);\min(f_2);\max(f_3);\min(f_4);\min(f_5);\max(f_6))$

The remaining or remainder set of offspring re-factoring operations is subject to a sorting process based on their corresponding dominance level (322). In an exemplary embodiment, the dominance level corresponds to the fitness score assessment. A child re-factoring operation that is closest to the ideal fitness score is selected as a next parent re-factoring operation (324). The fitness score assessment shown and described in steps (314)-(320) and the subsequent sorting and selection at steps (322)-(324) is an iterative process with the selection of one or more re-factoring operations as a next parent or set of parent re-factoring operations to be subject to a genetic operation and offspring population. The iterative process of prioritization of re-factoring operations has a stopping point. For example, the stopping point may correspond to a quantity of iterations, or in an embodiment a quality measurement corresponding to the ideal fitness score, $F_{ideal}$. As shown herein, following step (324), an assessment is conducted to determine if the stopping point criteria has been attained (326). A negative response to the assessment is followed by a return to step (310), and a positive response to the assessment is followed by application of the identified and prioritized re-factoring operations from the sub-set to the source code (328). Output from the application at step (328) produces one or more micro-service candidates (330).

The prioritization as shown and described herein as a multi-objective optimization problems, which in an exemplary embodiment uses a non-dominated sorting genetic algorithm e.g. NSGA-II. This prioritization of the re-factoring operations enables developers to prioritize with response to time and resource constraints. Accordingly, the prioritization shown and described herein identifies and prioritizes a sequence of re-factoring operations to improve downstream micro-service identification, leading to high-quality micro-services with low operation costs and high functional cohesion.

Embodiments shown and described herein may be in the form of a computer system for use with the knowledge engine (150) to identify and prioritize a sequence of re-factoring operations to improve downstream micro-service identification for select source code. Aspects of the tools and managers, e.g., (152), (154), (156), and (158), and their associated functionality may be embodied in a computer system/server in a single location, or in an embodiment, may be configured in a cloud-based system sharing computing resources. With references to FIG. 4, a block diagram (400) is provided illustrating an example of a computer system/server (402), hereinafter referred to as a host (402) in communication with a cloud based support system, to implement the processes described above with respect to FIG. 3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
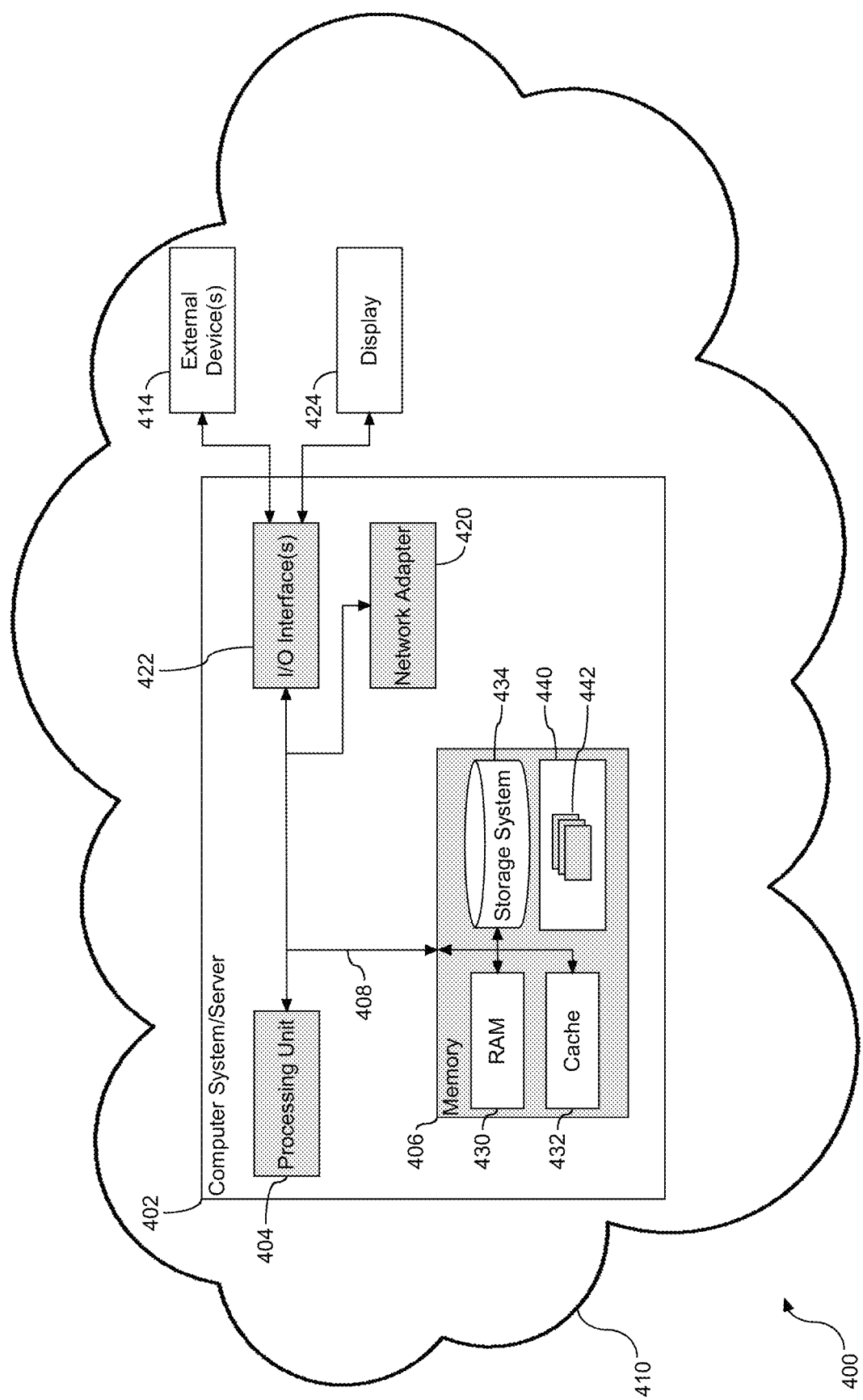
FIG. 4 depicts a block diagram illustrating an example of a computer system/server of a cloud based support system, to implement the system and processes described above with respect to FIGS. 1-3.

As shown in FIG. 4, host (402) is shown in the form of a general-purpose computing device. The components of host (402) may include, but are not limited to, one or more processors or processing units (404), e.g., hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to identify one or more re-factoring operations for source code, which when applied to the source code produce one or more micro-service candidates. For example, the set of program modules (442) may include the tools (152), (154), (156), and (158) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In an embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
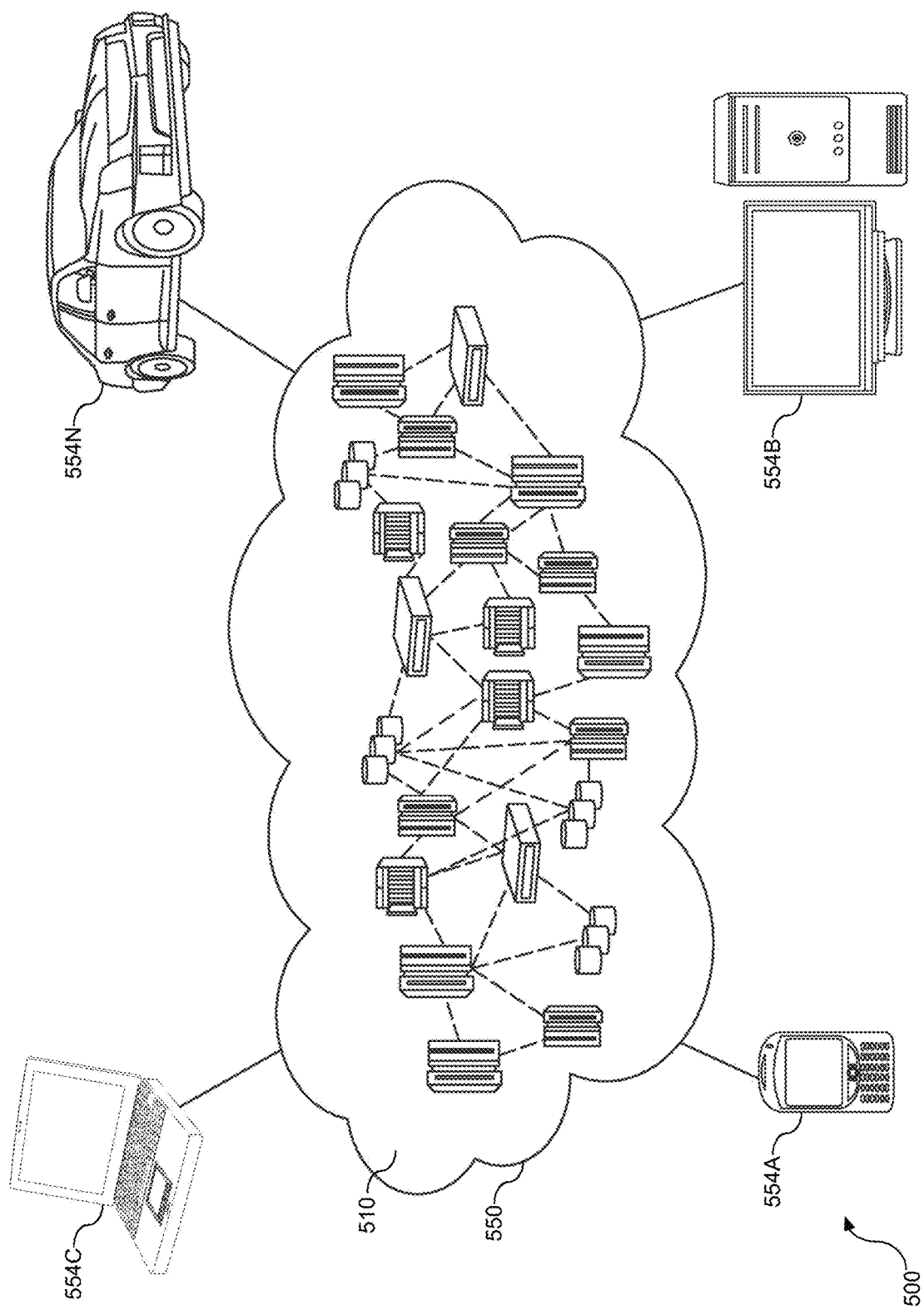
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
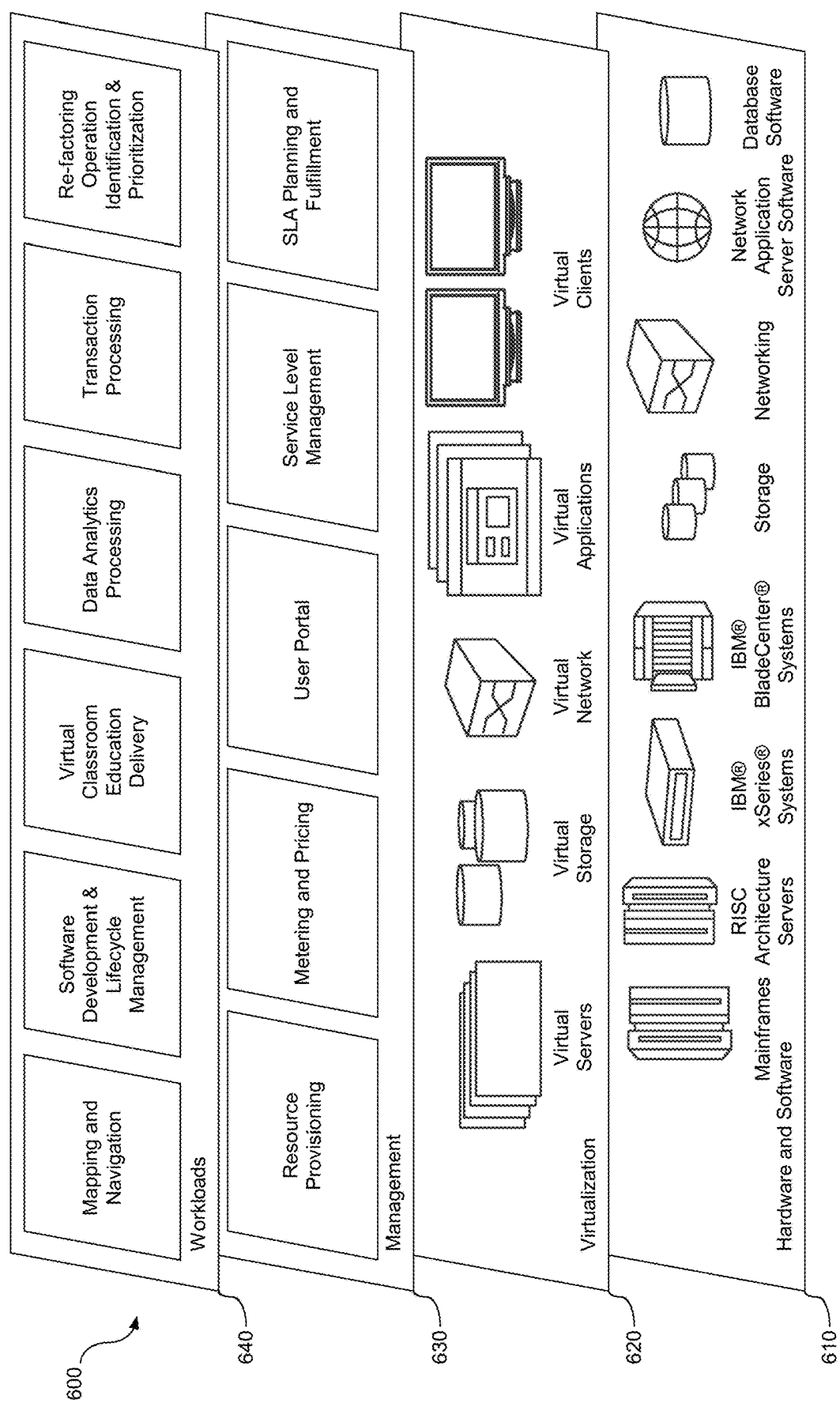
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In an example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and re-factoring operation identification and prioritization.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to train a ML model and leverage the trained model to classify micro-services with respect to compliance requirements.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processor operatively coupled to memory;
   one or more took operatively coupled to the processor, the one or more took including:
      a genetic manager to apply a genetic algorithm to one or more parent re-factoring operations selected from an initial identified set of re-factoring operations for source code, the applied genetic algorithm to produce an offspring population of the one or more parent re-factoring operations as a sub-set of the one or more parent re-factoring operations;
      a score manager operatively coupled to the genetic manager, the score manager to measure a fitness score of each re-factoring operation in the sub-set, including collect runtime traces of the source code and apply the collected runtime traces to the sub-set; and
      a classifier to prioritize re-factoring operations within the sub-set based on the measured fitness score of each re-factoring operation in the sub-set; and responsive to the re-factoring operations prioritization, the processor to selectively apply one or more of the re-factoring operations from the sub-set to the source code and produce one or more micro-service candidates.

2. The computer system of claim 1, wherein the fitness score measure of each re-factoring operation in the sub-set includes the score manager to modify the collected runtime traces according to the re-factoring operations in the sub-set, and apply a clustering algorithm on the modified runtime traces, the applied clustering algorithm to identify micro-service candidates.

3. The computer system of claim 2, wherein the fitness score measure of each re-factoring operation in the sub-set further comprising the score manager to measure a quality of the identified micro-services candidates.

4. The computer system of claim 3, further comprising the score manager to select one or more re-factoring operations in the sub-set having a smallest Euclidean distance to a maximum combination of objective measurements.

5. The computer system of claim 1, further comprising the genetic manager to apply a crossover operator to generate a combination of offspring re-factoring operations, and apply a mutation operator to introduce variability to the generated combination.

6. The computer system of claim 1, wherein the application of the genetic algorithm and the fitness score measurement is an iterative process, and further comprising the score manager to select a re-factoring operation from the sub-set as a next parent re-factoring operation on an objective factor, and iteratively apply the selected re-factoring operation to the iterative process.

7. A computer program product comprising a computer readable storage medium having a program code embodied therewith, the program code executable by a processor to:
   identify an initial set of re-factoring operations for source code;
   apply a genetic algorithm to one or more parent re-factoring operations selected from the initial set of re-factoring operations identified for the source code, the applied genetic algorithm producing an offspring population of the one or more parent re-factoring operations as a sub-set of the one or more parent re-factoring operations;
   measure a fitness score of each re-factoring operation in the sub-set, including collect runtime traces of the source code and apply the collected runtime traces to the sub-set;
   prioritize re-factoring operations within the sub-set based on the measured fitness score of each re-factoring operation in the sub-set; and
   responsive to the re-factoring operations prioritization, selectively apply one or more of the re-factoring operations from the sub-set to the source code and produce one or more micro-service candidates.

8. The computer program product of claim 7, wherein the fitness score measure of each re-factoring operation in the sub-set includes program code to modify the collected runtime traces according to the re-factoring operations in the sub-set, and apply a clustering algorithm on the modified runtime traces, the applied clustering algorithm to identify micro-service candidates.

9. The computer program product of claim 8, wherein the fitness score measure of each re-factoring operation in the sub-set further comprising program code to measure a quality of the identified micro-services candidates.

10. The computer program product of claim 9, further comprising program code to select one or more re-factoring operations in the sub-set having a smallest Euclidean distance to a maximum combination of the objective measurements.

11. The computer program product of claim 7, wherein the program code to apply a genetic algorithm to the identified re-factoring operations includes applying a crossover operator to generate a combination of offspring re-factoring operations, and applying a mutation operator to introduce variability to the generated combination.

12. The computer program product of claim 7, wherein the program code to apply the genetic algorithm and measure the fitness score is an iterative process, and further comprising program code to select a re-factoring operation from the sub-set as a next parent re-factoring operation on an objective factor, and iteratively apply the selected re-factoring operation to the iterative process.

13. A method comprising:
    identifying an initial set of re-factoring operations for source code;
    applying a genetic algorithm to one or more parent re-factoring operations selected from the initial set of re-factoring operations identified for the source code, the applied genetic algorithm producing an offspring population of the one or more parent re-factoring operations as a sub-set of the one or more parent re-factoring operations;
    measuring a fitness score of each re-factoring operation in the sub-set, including collecting runtime traces of the source code and applying the collected runtime traces to the sub-set; prioritizing re-factoring operations within the sub-set based on the measured fitness score of each re-factoring operation in the sub-set; and
    responsive to the re-factoring operations prioritization, selectively applying one or more of the re-factoring operations from the sub-set to the source code and producing one or more micro-service candidates.

14. The method of claim 13, wherein measuring the fitness score of each re-factoring operation in the sub-set includes modifying the collected runtime traces according the re-factoring operations in the sub-set, and applying a clustering algorithm on the modified runtime traces, the applied clustering algorithm identifying micro-service candidates.

15. The method of claim 14, wherein measuring the fitness score of each re-factoring operation in the sub-set further comprising measuring a quality of the identified micro-services candidates.

16. The method of claim 15, further comprising selecting one or more re-factoring operations in the sub-set having a smallest Euclidean distance to a maximum combination of the objective measurements.

17. The method of claim 13, wherein applying a genetic algorithm to the identified re-factoring operations includes applying a crossover operator to generate a combination of offspring re-factoring operations, and applying a mutation operator to introduce variability to the generated combination.

18. The method of claim 13, wherein applying the genetic algorithm and measuring the fitness score is an iterative process, and further comprising selecting a re-factoring operation from the sub-set as a next parent re-factoring operation on an objective factor, and iteratively applying the selected re-factoring operation to the iterative process.

* * * * *